US010307858B2

(12) United States Patent
Miwa et al.

(10) Patent No.: US 10,307,858 B2
(45) Date of Patent: Jun. 4, 2019

(54) WELDING GUN

(71) Applicant: HONDA MOTOR CO., LTD., Tokyo (JP)

(72) Inventors: Hiroshi Miwa, Hagagun (JP); Yohei Teragaito, Hagagun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 582 days.

(21) Appl. No.: 15/032,247

(22) PCT Filed: Oct. 28, 2014

(86) PCT No.: PCT/JP2014/078649
§ 371 (c)(1),
(2) Date: Apr. 26, 2016

(87) PCT Pub. No.: WO2015/064582
PCT Pub. Date: May 7, 2015

(65) Prior Publication Data
US 2016/0236295 A1 Aug. 18, 2016

(30) Foreign Application Priority Data

Oct. 29, 2013 (JP) ................................. 2013-224576

(51) Int. Cl.
B23K 11/31 (2006.01)
B23K 11/11 (2006.01)
B23K 11/36 (2006.01)

(52) U.S. Cl.
CPC ........... *B23K 11/314* (2013.01); *B23K 11/115* (2013.01); *B23K 11/36* (2013.01)

(58) Field of Classification Search
CPC ..... B23K 11/115; B23K 11/314; B23K 11/36; B23K 11/317; B23K 11/318; Y10S 901/42

(Continued)

(56) References Cited

U.S. PATENT DOCUMENTS 3,008,034 A 11/1961 Wolfbauer, Jr.
7,370,746 B2 5/2008 Iguchi et al.
(Continued)

FOREIGN PATENT DOCUMENTS

CN 102371427 A * 3/2012 ........... B23K 11/314
CN 102941407 A 2/2013
(Continued)

OTHER PUBLICATIONS

Chinese Office Action and Search Report, dated Aug. 15, 2017, for Chinese Application No. 201480059268.0.
(Continued)

*Primary Examiner* — Dana Ross
*Assistant Examiner* — James F Sims, III
(74) *Attorney, Agent, or Firm* — Birch, Stewart, Kolasch & Birch, LLP

(57) ABSTRACT

To provide a welding gun capable of improving the durability by effectively bearing the load in the thrust direction, and capable of providing a heavyweight and large-sized movable gun arm, even in a small-sized main body unit. A welding gun 10 of a guide groove type is provided with a thrust direction guide mechanism including: two guide pins 19a and 19b provided to an arm holder 13 in an integrated manner by penetrating first and second guide grooves 17a and 17b; brackets 23a and 23b being fixedly provided to the end portions of the guide pins 19a and 19b, and having a length sufficient to traverse the first and second guide grooves 17a and 17b in a direction orthogonal to the axis line of the guide pins 19a and 19b; and thrust bearing members 24a and 24b being provided to the end portions of the brackets 23a and 23b, abutting on a side plate 11a of a gun body 11, so as to be movable along the first and second guide grooves 17a and 17b.

10 Claims, 2 Drawing Sheets

(58) Field of Classification Search
USPC .................. 219/86.21, 86.25, 86.33; 901/42
See application file for complete search history.

(56) References Cited

U.S. PATENT DOCUMENTS

| | | |
|---|---|---|
| 8,853,595 B2 | 10/2014 | Matsumoto et al. |
| 9,238,551 B2 | 1/2016 | Kalitta et al. |
| 2012/0031887 A1 | 2/2012 | Matsumoto et al. |

FOREIGN PATENT DOCUMENTS

| | | |
|---|---|---|
| EP | 1 442 819 A2 | 8/2004 |
| FR | 2 459 105 A1 | 1/1981 |
| JP | 2008-142752 A | 8/2008 |
| JP | 2012-35274 A | 2/2012 |

OTHER PUBLICATIONS

International Search Report for PCT/JP2014/078649 dated Jan. 20, 2015.

* cited by examiner

WELDING GUN

TECHNICAL FIELD

The present invention relates to a welding gun. Specifically, the present invention relates to a welding gun (clamp welder gun) for welding a workpiece that is interposed between a pair of electrode tips.

BACKGROUND ART

A so-called guide groove type has conventionally been well-known as this type of welding gun, as disclosed in, for example, Patent Document 1, in which a movable gun arm is moved (opened or closed) by sliding and guiding part of the arm side, by way of a guide groove formed in the gun body side. According to the disclosure, a pin or roller follower is provided to part of the arm side, and is engaged with the guide groove, thereby facilitating the operation of opening or closing the movable gun arm.

Patent Document 1: Japanese Unexamined Patent Application, Publication No. 2012-35274

DISCLOSURE OF THE INVENTION

Problems to be Solved by the Invention

Robots need to be downsized in order to improve the efficiency in welding car bodies and to save energy. Against such a background, a welding gun (main body unit) is required to be further downsized, while a heavyweight and large-sized gun arm adapted to car-body shapes is in demand at the same time.

In particular, a small-sized welding gun including a large-sized and heavyweight movable gun arm as described above may not suffer from any problem as long as the welding gun maintains a posture while welding, such that the portions engaging with the guide groove (the guide pin or roller follower in Patent Document 1) are horizontally oriented.

However, when the posture of the welding gun significantly changes depending on the welding points, further load will be applied to the movable gun arm in the thrust direction, and the movable gun arm will no longer be able to bear such load to the full extent. As a result, components become worn, causing backlash in the movable gun arm, generating defects such as chip offsets, and deteriorating the weld quality.

An object of the present invention is to provide a welding gun capable of improving the durability by effectively bearing the load in the thrust direction, and capable of providing a heavyweight and large-sized movable gun arm, even in a small-sized main body unit.

Means for Solving the Problems

A first aspect of the present invention is a welding gun, including a fixed gun arm fixed to a gun body, a movable gun arm opposed to the fixed gun arm, and a drive unit provided to the side of the gun body, in which the movable gun arm is connected to an arm holder that is movable along a guide groove formed to the side of the gun body, and the drive unit actuates the arm holder to open or close the movable gun arm; the welding gun is provided with a thrust direction guide mechanism including: a plurality of guide pins provided to the arm holder in an integrated manner by penetrating the guide groove; a bracket being fixedly provided to end portions of the guide pins, and having a length sufficient to traverse the guide groove in a direction orthogonal to an axis line of the guide pins; and a thrust bearing member being provided to end portions of the bracket, and abutting on the side of the gun body, so as to be movable along the guide groove.

According to the first aspect of the present invention, the thrust direction guide mechanism makes it possible to achieve thrust load bearing, which is highly abrasion-resistant, low in sliding friction, and independent of cam profiles. As a result, the load applied to the welding gun in the thrust direction can be reduced without the need to specify a posture of the welding gun during the welding, and the durability of the welding gun can be improved.

In a second aspect of the present invention according to the first aspect, it is preferable that the thrust bearing member is a ball transfer unit having spherical objects partly abutting on the side of the gun body.

According to the second aspect of the present invention, since the spherical objects are highly durable and reliable and have low friction under pressure, it possible to bear greater load in the thrust direction.

In a third aspect of the present invention according to the first or second aspect, it is preferable that the bracket, or at least an upper bracket, is provided aslope in a direction along a movement surface on the gun body, such that two thrust bearing members are positioned in an equal length on both sides of the guide groove, when the bracket moves along a curved section of the guide groove.

According to the third aspect of the present invention, when the bracket being aslope moves along the curved section of the guide groove, the bracket can move on a movement surface on the gun body side in a balanced manner; and in a case in which the thrust bearing member is moved on the reinforcing plate, the reinforcing plate can be formed compactly along the guide groove.

Effects of the Invention

According to the present invention, it is possible to provide a welding gun capable of improving the durability by effectively bearing the load in the thrust direction, and capable of providing a heavyweight and large-sized movable gun arm, even in a small-sized main body unit.

PREFERRED MODE FOR CARRYING OUT THE INVENTION

An embodiment of a welding gun according to the present invention is described in detail with reference to the drawings.

Figure 1:
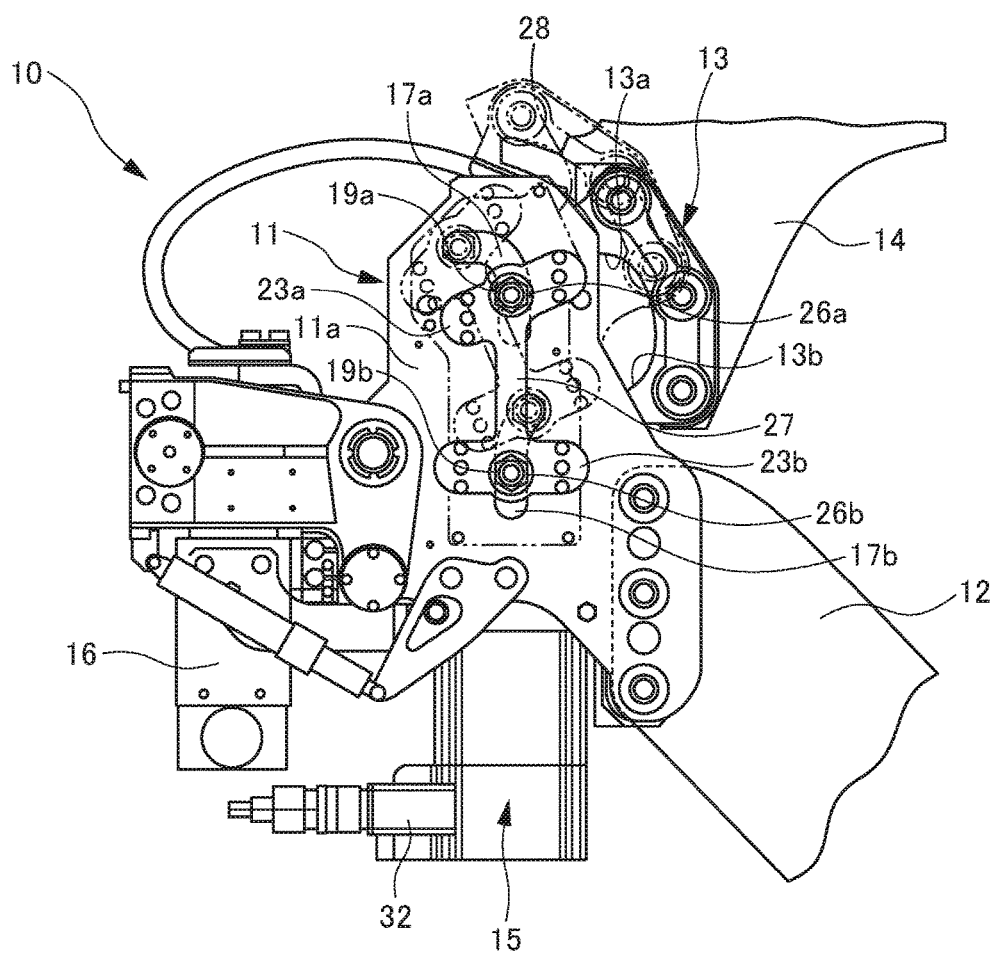
FIG. 1 is a side-view of an essential part of a welding gun showing an embodiment of the present invention.
Figure 2:
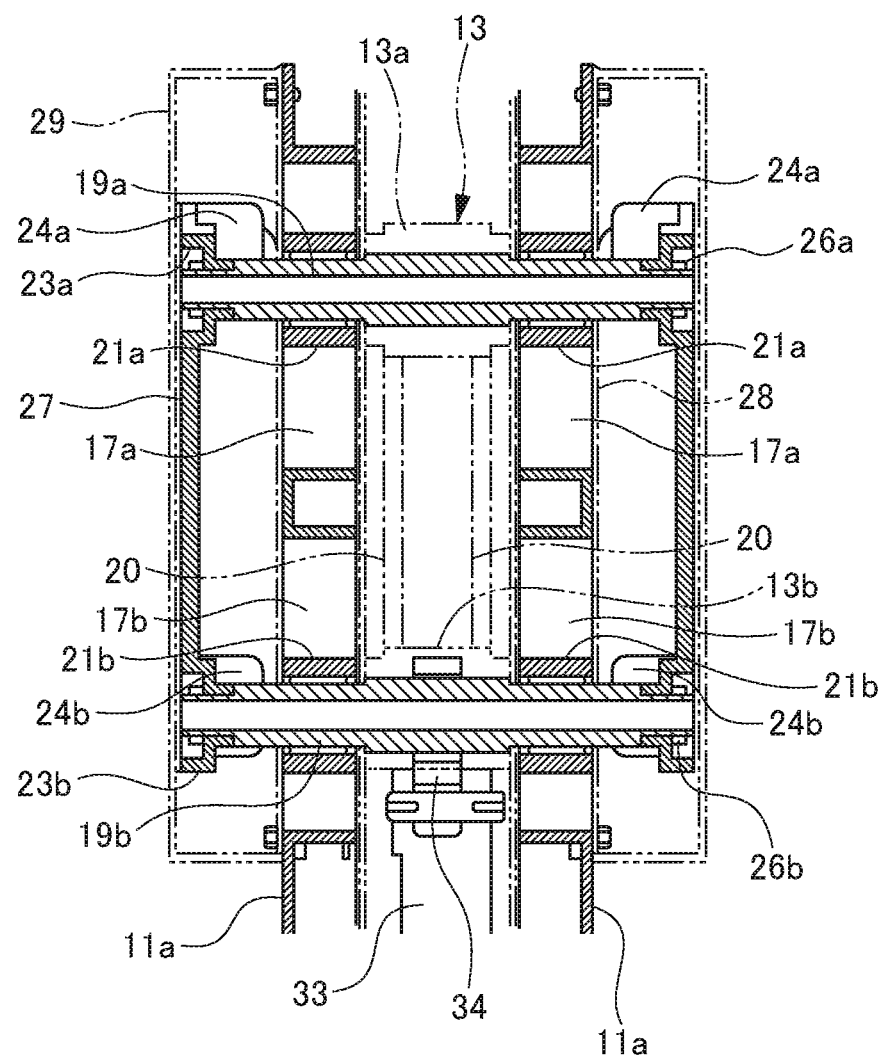
FIG. 2 is a vertical sectional front view of the essential part of FIG. 1.

FIG. 1 is a side-view of an essential part of a welding gun showing an embodiment of the present invention; and FIG. 2 is a vertical sectional front view of the essential part of FIG. 1.

As shown in FIGS. 1 and 2, a welding gun 10 is a welding gun of a guide groove type, and moreover, it is a so-called servo gun using a servomotor for the drive source.

The welding gun 10 includes a gun body 11, a fixed gun arm 12, an arm holder 13, a movable gun arm 14, a motor drive unit (drive unit) 15, and a transformer 16.

In relation to a right-and-left-pair of side plates 11a of the gun body 11, a first guide groove 17a having an upper end being backwardly curved, and a second guide groove 17b being forwardly curved, are formed so as to be opposed and separated from each other and in a vertical direction.

A base end portion of the fixed gun arm 12 is fixed to a lower portion of the gun body 11; and the fixed gun arm 12 extends forwardly from the gun body 11 (to the right side in FIG. 1). An electrode tip (not shown) is upwardly attached to a tip portion of the fixed gun arm 12.

The arm holder 13 is provided by extending a top-and-bottom-pair of leg portions 13a and 13b between the side plates 11a of the gun body 11; and guide pins 19a and 19b each composed of a hollow shaft horizontally penetrate through each tip of the leg portions 13a and 13b.

The top-and-bottom pair of leg portions 13a and 13b are integrated with each other through a right-and-left-pair of connecting rods 20; and an upper guide pin 19a penetrates through the first guide groove 17a, and a lower guide pin 19b penetrates through the second guide groove 17b, each in a separate manner.

A roller follower 21a engaging with the first guide groove 17a, and a roller follower 21b engaging with the second guide groove 17b are attached around the pins, near both ends of the guide pins 19a and 19b.

Therefore, the roller follower 21a of the upper guide pin 19a moves along the first guide groove 17a, and the roller follower 21b of the lower guide pin 19b moves along the second guide groove 17b; as a result, the arm holder 13 moves along the first guide groove 17a and the second guide groove 17b.

A base end portion of the movable gun arm 14 is fixed to the arm holder 13; and the movable gun arm 14 extends forwardly from the arm holder 13 (to the right side in FIG. 1). An electrode tip (not shown) is downwardly attached to a tip portion of the movable gun arm 14.

Therefore, with the arm holder 13 moving along the first guide groove 17a and the second guide groove 17b, the movable gun arm 14 together with the arm holder 13 also moves along the guide groove 17.

In the present embodiment, a thrust direction guide mechanism is provided to the end portion of each of the guide pins 19a and 19b, which penetrate through the right-and-left-pair of side plates 11a of the gun body 11.

The thrust direction guide mechanism includes: brackets 23a and 23b being fixedly provided to the end portions of the guide pins 19a and 19b, and having a length sufficient to traverse the first and second guide grooves 17a and 17b in a direction orthogonal to the axis line of the guide pins 19a and 19b; and ball transfer units 24a and 24b (an example of which may include PLANEVEYOR manufactured by ATEC CO., LTD.) being attached to the end portions of the brackets 23a and 23b, and serving as thrust bearing members having spherical objects partly abutting on the side plate 11a of the gun body 11, so as to be movable along the first and second guide grooves 17a and 17b.

Specifically, the guide pins 19a and 19b each consist of a double-ended bolt; and the brackets 23a and 23b engage with the threaded portions of the guide pins 19a and 19b, respectively. The brackets 23a and 23b are screwed to the end portions of the guide pins 19a and 19b, respectively, by way of nuts 26a and 26b which threadedly engage with the threaded portions of the guide pins 19a and 19b, respectively.

The upper bracket 23a is provided upwardly and forwardly aslope in relation to the direction along the side plate 11a which is a movement surface on the gun body 11, such that the ball transfer unit 24a is positioned in an equal length on both sides of the first guide groove 17a, when the bracket 23a moves along the curved section of the first guide groove 17a.

The two brackets 23a and 23b are integrated with each other through a connecting rod 27, but may not necessarily be integrated with each other, in particular. Each of the ball transfer units 24a and 24b may be configured to move on a reinforcing plate 28, which is attached on the side plate 11a of the gun body 11, and which is composed of a material harder than the spherical objects of the ball transfer units 24a and 24b. A cover 29 may be fixedly provided on the side plate 11a of the gun body 11, so as to completely cover the thrust direction guide mechanism.

A motor drive unit 15 includes a unit housing, a servomotor and a feed screw mechanism (which are not shown), as well as an encoder 32 and a pressurization rod 33.

The unit housing accommodates the servomotor, the feed screw mechanism, the encoder 32 and the pressurization rod 33. The unit housing is integrally fixed to the lower end of the two side plates 11a of the gun body 11.

The servomotor is connected to the pressurization rod 33, such that the rotational motion of the servomotor is converted to advancing/retreating motion (vertical motion) in the direction of the axis line of the pressurization rod 33, by virtue of the feed screw mechanism consisting of ball screws and nuts.

The tip portion of the pressurization rod 33 is attached via a knuckle 34 to the guide pin 19b that penetrates through the leg portion 13b under the arm holder 13.

The encoder 32 detects a rotation angle of the servomotor, in order to accurately determine the timing of applying a current between the two electrode tips, in terms of the position of the electrode tip (not shown) of the movable gun arm 14 having moved in relation to the electrode tip (not shown) of the fixed gun arm 12, and to control the operation of the movable gun arm 14.

The transformer 16 is attached to the exterior of the motor drive unit 15. When a workpiece (plate material) is pinched between the electrode tip of the movable gun arm 14 and the electrode tip of the fixed gun arm 12, the transformer 16 applies a welding current between the electrode tips.

With the welding gun 10 as thus constituted, when the servomotor is driven, the pressurization rod 33 vertically moves, and the arm holder 13 vertically moves by virtue of the lower guide pin 19b, to which the knuckle 34 of the pressurization rod 33 is attached; as a result, the movable gun arm 14 opens or closes. When the movable gun arm 14 is closed, the workpiece (plate material) is pinched and spot-welded between the electrode tip of the movable gun arm 14 and the electrode tip of the fixed gun arm 12.

When the movable gun arm 14 is opened or closed as described above, further load may be applied to the movable gun arm 14 in the thrust direction, depending on the posture of the welding gun 10. This is particularly remarkable in cases where the gun body 11 is small-sized, and the movable gun arm 14 is large-sized and heavyweight. As a result, components such as the leg portions 13a and 13b of the arm holder 13 may become worn, causing backlash in the movable gun arm 14, generating defects such as chip offsets, and deteriorating the weld quality.

However, the present embodiment provides the thrust direction guide mechanism including: the two guide pins 19a and 19b provided to the arm holder 13; the brackets 23a and 23b being fixedly provided to the end portions of the guide pins 19a and 19b, and having a length sufficient to traverse the first and second guide grooves 17a and 17b in a direction orthogonal to the axis line of the guide pins 19a and 19b; and the ball transfer units 24a and 24b being attached to the end portions of the brackets 23a and 23b, and abutting on the side plate 11a of the gun body 11, so as to be movable along the first and second guide grooves 17a and 17b.

By virtue of this thrust direction guide mechanism, it is possible to achieve thrust load bearing, which is highly durable and abrasion-resistant, low in sliding friction, and independent of cam profiles, in which the load applied to the welding gun 10 in the thrust direction can be reduced without the need to specify a posture of the welding gun 10 during the welding, and the durability of the welding gun 10 can be improved.

The ball transfer units 24a and 24b having the spherical objects partly abutting on the side plate 11a of the gun body 11 are used for the thrust bearing members. As a result, the highly durable and reliable spherical objects having low friction under pressure make it possible to bear greater load in the thrust direction.

The upper bracket 23a is provided aslope in relation to the direction along the side plate 11a which is a movement surface on the gun body 11, such that the two ball transfer units 24a and 24b are positioned in an equal length on both sides of the first guide groove 17a, when the bracket 23a moves along the curved section of the first guide groove 17a.

As a result, when the upper bracket 23a moves along the curved section of the first guide groove 17a, the upper bracket 23a can move on the side plate 11a of the gun body 11 in a balanced manner; and in a case in which the ball transfer unit 24a is moved on the reinforcing plate 28, the reinforcing plate 28 can be formed compactly along the first guide groove 17a.

As a result of these, it is possible to provide the welding gun 10 capable of improving the durability by effectively bearing the load in the thrust direction, and capable of providing the heavyweight and large-sized movable gun arm 14, even in the small-sized gun body 11.

Needless to mention, the present invention is not limited to the embodiment described above, and can be modified in various ways without departing from the spirit of the present invention.

For example, the first and second guide grooves may be formed of a series of inverted J-shaped grooves. The ball transfer unit is not limited to the example illustrated above, and may be of any other structure such as a rolling element structure or sliding element structure. The welding gun is not limited to a servo gun using a servomotor for the drive source, and may be a welding gun using a pressurization cylinder for the drive source.

EXPLANATION OF REFERENCE NUMERALS 10 welding gun
11 gun body
12 fixed gun arm
13 arm holder
14 movable gun arm
15 motor drive unit
17a first guide groove
17b second guide groove
19a, 19b guide pin
23a, 23b bracket
24a, 24b ball transfer unit

The invention claimed is:

1. A welding gun, including a fixed gun arm fixed to a gun body, a movable gun arm opposed to the fixed gun arm, and a drive unit provided to a side of the gun body, in which the movable gun arm is connected to an arm holder that is movable along a guide groove formed to the side of the gun body, and the drive unit actuates the arm holder to open or close the movable gun arm, the welding gun comprising a thrust direction guide mechanism including:
a plurality of guide pins provided to the arm holder in an integrated manner by penetrating the guide groove;
a bracket being fixedly provided to end portions of the guide pins, and having a length sufficient to traverse the guide groove in a direction orthogonal to an axis line of the guide pins; and
a thrust bearing being provided to end portions of the bracket, and abutting on the side of the gun body, so as to be movable along the guide groove.

2. The welding gun according to claim 1, wherein the thrust bearing is a ball transfer unit having spherical objects partly abutting on the side of the gun body.

3. The welding gun according to claim 2, wherein an upper bracket is provided aslope in a direction along a movement surface on the gun body, and further including a second thrust bearing mounted on a second bracket on another side of the guide groove for guiding the upper bracket along a curved section of the guide groove.

4. The welding gun according to claim 3, wherein the two brackets are integrated with each other through a connecting rod.

5. The welding gun according to claim 1, wherein an upper bracket is provided aslope in a direction along a movement surface on the gun body, and further including a second thrust bearing mounted on a second bracket on another side of the guide groove for guiding the upper bracket along a curved section of the guide groove.

6. The welding gun according to claim 5, wherein the two brackets are integrated with each other through a connecting rod.

7. The welding gun according to claim 1, wherein each of the plurality of guide pins consists of a double-ended bolt wherein the bracket is engaged with a threaded portion on each end of the guide pins.

8. The welding gun according to claim 7, wherein the bracket is secured to the threaded portion on each end of the guide pins by nuts threadedly engaged with the threaded portions of the guide pins.

9. The welding gun according to claim 1, wherein the thrust bearing is a ball transfer unit attached to the bracket provided at end portions of the guide pins.

10. The welding gun according to claim 1, wherein the ball transfer unit is spherical with a low friction under pressure.

* * * * *